United States Patent
Allsup et al.

(10) Patent No.: US 8,213,173 B2
(45) Date of Patent: Jul. 3, 2012

(54) MASS DATA STORAGE DEVICE CARTRIDGE FLEXIBLE INTERCONNECT

(75) Inventors: David Scott Allsup, Windsor, CO (US); Matthew James Dozier, Loveland, CO (US); Brent R. Brown, Maple Grove, MN (US); Peter R. Janik, Shakopee, MN (US)

(73) Assignee: Seagate Technology LLC, Capurtino, CA (US)

( * ) Notice: Subject to any disclaimer, the term of this patent is extended or adjusted under 35 U.S.C. 154(b) by 38 days.

(21) Appl. No.: 12/472,187

(22) Filed: May 26, 2009

(65) Prior Publication Data
US 2009/0293075 A1    Nov. 26, 2009

Related U.S. Application Data

(60) Provisional application No. 61/055,877, filed on May 23, 2008.

(51) Int. Cl.
G06F 1/16 (2006.01)
H01R 12/00 (2006.01)
A47B 81/00 (2006.01)

(52) U.S. Cl. ......... 361/679.36; 361/679.33; 361/679.34; 439/67; 312/223.2

(58) Field of Classification Search .......... 361/724–727, 361/679.01–679.4; 312/223.1, 223.2; 211/26; 439/67; 360/99.01–99.09
See application file for complete search history.

(56) References Cited

U.S. PATENT DOCUMENTS

| | | | |
|---|---|---|---|
| 4,926,291 A | 5/1990 | Sarraf | |
| 4,937,806 A | 6/1990 | Babson et al. | |
| 5,004,207 A | 4/1991 | Ishikawa et al. | |
| 5,253,129 A * | 10/1993 | Blackborow et al. | 360/69 |
| 5,402,308 A * | 3/1995 | Koyanagi et al. | 361/679.34 |
| 5,426,562 A | 6/1995 | Morehouse et al. | |
| 5,463,527 A | 10/1995 | Hager et al. | |
| 5,808,866 A | 9/1998 | Porter | |
| 5,837,934 A | 11/1998 | Valavanis et al. | |
| 6,094,342 A | 7/2000 | Dague et al. | |
| 6,154,360 A | 11/2000 | Kaczeus, Sr. et al. | |
| 6,166,901 A | 12/2000 | Gamble et al. | |

(Continued)

OTHER PUBLICATIONS iVDR Hard Disk Drive—Outline of Hardware Specification—(Standard type), iVDR Hard Disk Drive Consortium, Version 2.00, Aug. 2008, (26 pgs). iVDR Hard Disk Drive—Outline of Hardware Specification—(Mini type), iVDR Hard Disk Drive Consortium, Version 2.00, Aug. 2008, (26 pgs).

(Continued)

*Primary Examiner* — Jayprakash N Gandhi
*Assistant Examiner* — Nidhi Desai
(74) *Attorney, Agent, or Firm* — Mitchell K. McCarthy (57) ABSTRACT

This disclosure includes a portable data storage device comprising a mass data storage device, a cartridge housing enclosing a mass data storage device, and a flexible interconnect. The flexible interconnect includes an external electrical connector mechanically coupled to the cartridge, an internal electrical connector mechanically and electrically coupled to a data port of the mass data storage device, and a set of flexible electrical conductors electrically coupling the external electrical connector to the internal electrical connector. The flexible electrical conductors are routed within the cartridge such that no portion of the set of flexible electrical conductors lies in a volume defined by the space between the external electrical connector and the internal electrical connector.

10 Claims, 6 Drawing Sheets

U.S. PATENT DOCUMENTS

| | | | |
|---|---|---|---|
| 6,304,440 B1 * | 10/2001 | Lin | 361/679.34 |
| 6,501,644 B1 | 12/2002 | Silverman et al. | |
| 6,545,865 B2 * | 4/2003 | Albrecht et al. | 361/679.34 |
| 6,690,539 B2 | 2/2004 | Gallo et al. | |
| 6,867,942 B2 | 3/2005 | Albrecht et al. | |
| 6,873,524 B2 * | 3/2005 | Kaczeus et al. | 361/679.33 |
| 2003/0174464 A1 * | 9/2003 | Funawatari et al. | 361/685 |
| 2006/0261528 A1 * | 11/2006 | Cheng et al. | 267/136 |

OTHER PUBLICATIONS

"[I-O Data] iVDR-H40, iVDR-H80", http://www.iodata.jp/prod/storage/hdd/2005/ivdr-h/print.htm, translation attached, retrieved Mar. 24, 2009, (4 pgs).

"I-O Data" http://iodata.jp/product/hdd/portable/usb2-ivdr/index.htm, translation attached, retrieved Mar. 24, 2009, (2 pgs).

* cited by examiner

MASS DATA STORAGE DEVICE CARTRIDGE FLEXIBLE INTERCONNECT

This application claims the benefit of U.S. Provisional Application No. 61/055,877, filed May 23, 2008, the entire content of which is incorporated by reference herein.

BACKGROUND

The need for portable data storage devices including large data storage capacities continues to increase. For example, portable data storage devices store movies, audio, personal information, still pictures, maps or other navigation information, or the like. These uses make large storage capacities and high data transfer rates desirable.

One common high-capacity data storage device with a relatively fast data transfer rate is a disc drive. A disc drive may include a housing encasing a magnetic disc, on which data is stored, a magnetic read and write head that reads data from and writes data to the magnetic disc, and control electronics that control the operation of the disc drive. Disc drives are commonly used in computers, personal media players and other devices.

SUMMARY

This disclosure includes a portable data storage device comprising a mass data storage device, a cartridge housing enclosing a mass data storage device, and a flexible interconnect. The flexible interconnect includes an external electrical connector mechanically coupled to the cartridge, an internal electrical connector mechanically and electrically coupled to a data port of the mass data storage device, and a set of flexible electrical conductors electrically coupling the external electrical connector to the internal electrical connector. The flexible electrical conductors are routed within the cartridge such that no portion of the set of flexible electrical conductors lies in a volume defined by the space between the external electrical connector and the internal electrical connector.

These and various other features and advantages will be apparent from the description and drawings, and from the claims.

DETAILED DESCRIPTION

Because of the advantages of disc drives, e.g., high data storage capacities and relatively high data transfer rates, disc drives have features that are desirable in portable data storage devices. However, standard disc drives are not modular or durable. The techniques disclosed herein may be used to increase the suitability of a disc drive as a portable data storage device, e.g., by improving durability. For example, a disc drive can be encased within a cartridge including a housing and shock protection to protect the disc drive from the external environment, such as, for example, dust, moisture, mechanical forces, and the like. A cartridge housing also provides a form factor that may be transported by a user and connectors that are robust to allow repeated insertion and removal of the disc drive from electronic devices.

A cartridge may include features that protect a disc drive enclosed by the cartridge housing. In some examples, the cartridge includes a flexible interconnect that electrically couples a data port of the disc drive to an external connector physically coupled to the cartridge. In some examples, the data port of the disc drive is a different physical specification than the external connector of the cartridge. For example, the data port of the disc drive may comprise a Serial Advanced Technology Attachment (SATA) port, and the external connector of the cartridge may comprise an Information Versatile Disk for Removable usage (iVDR) connector. The first end of the flexible interconnect may comprise an external electrical connector, such as, for example, an iVDR connector, and the second end of the flexible interconnect may comprise an internal electrical connector, such as, for example, a SATA connector. The flexible interconnect may comprise at least one flexible conductor between the first and second ends, such as, for example, one or more flexible wires, a flexible ribbon cable, or the like. In some examples, the flexible conductors may couple to the external electrical connector substantially perpendicular to a data port of the external electrical connector and may couple to the internal electrical connector substantially perpendicular to a data port of the internal electrical connector. The flexible interconnect may lessen the extent to which an abrupt mechanical force applied to the cartridge is transmitted to the disc drive.

The cartridge may also comprise an elastic shock mount within the cartridge housing, which surrounds the disc drive and mechanically decouples the disc drive from the cartridge housing. The elastic shock mount limits shock forces applied to the cartridge housing from transferring to the disc drive. The elastic shock mount may also include protrusions extending between an external surface of the disc drive and an interior surface of the cartridge housing. In this manner, the disc drive "floats" within the cartridge housing. Further, the elastic shock mount protrusions may be located adjacent to relatively durable portions of the disc drive and non-adjacent to more fragile portions of the disc drive such that forces transferred from a shock to the cartridge housing are distributed to the disc drive in a favorable manner. For example, the protrusions may be located adjacent to corners and edges of the disc drive and non-adjacent to moving parts of the disc drive such as the spindle motor, media discs and actuator assembly.

Figure 1A:
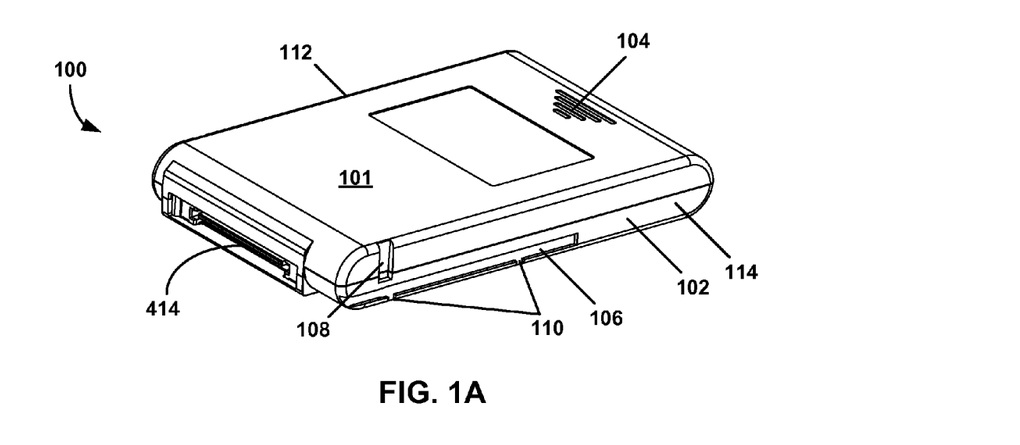
FIGS. 1A-1C illustrate an assembly including example cartridge enclosing a disc drive.
Figure 1B:
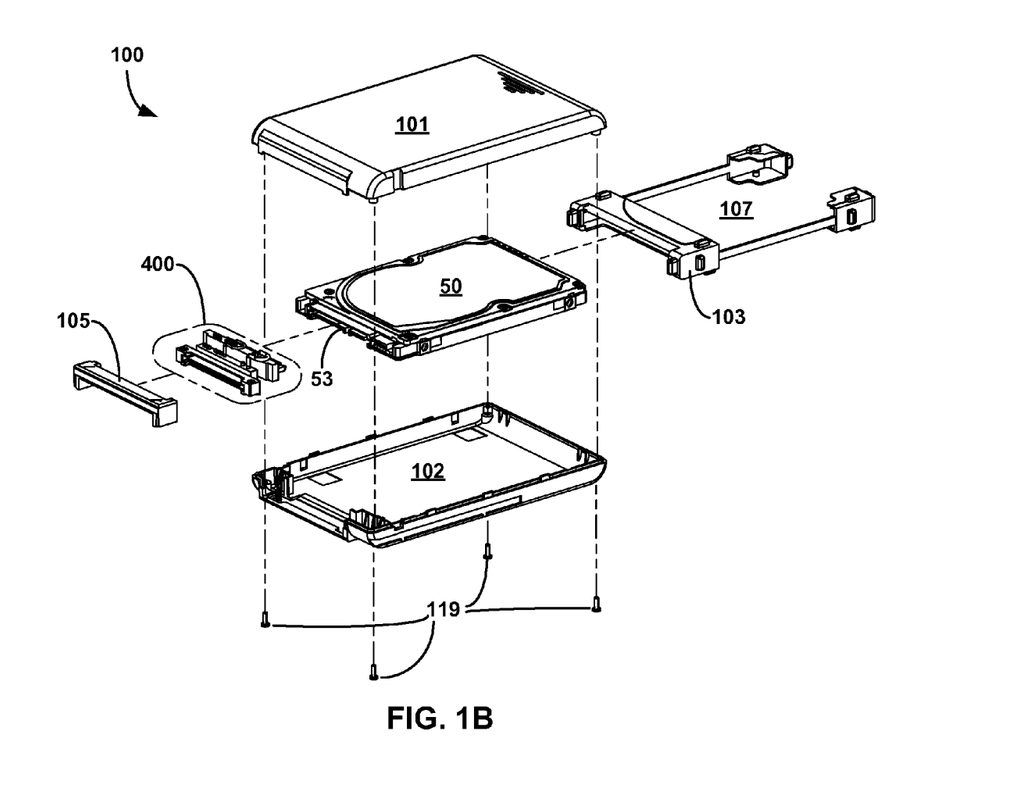
Figure 1C:
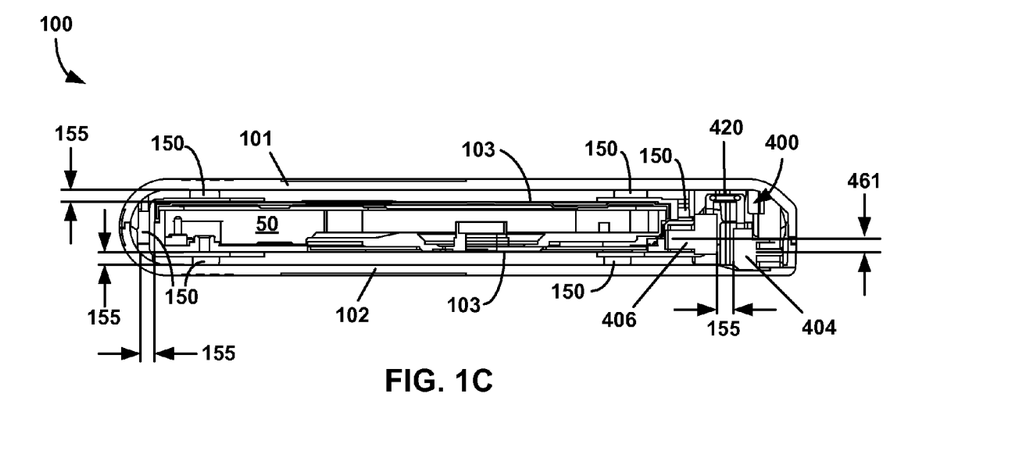

FIGS. 1A-1C illustrate a durable disc drive cartridge protecting a disc drive. More specifically, FIG. 1A shows perspective views of an example cartridge 100 that encloses disc drive 50, FIG. 1B shows an exploded view of cartridge 100 and disc drive 50, and FIG. 1C shows a cut-away view of cartridge 100 with disc drive 50.

Figure 5:
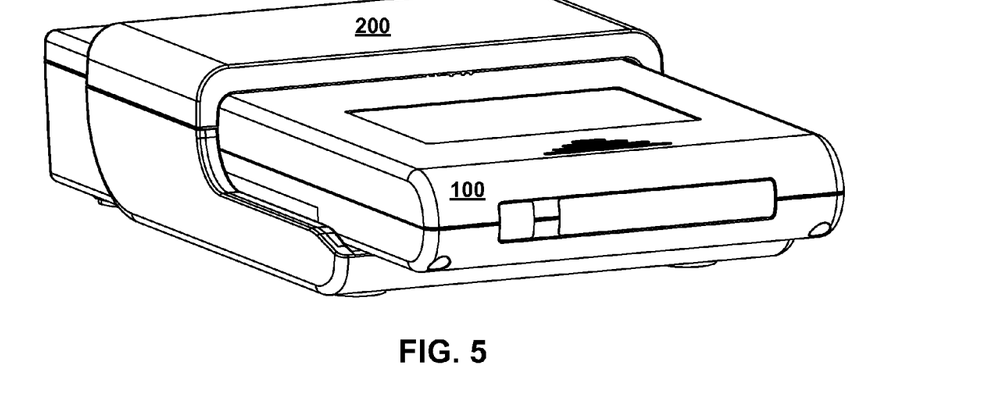
FIG. 5 is a perspective view illustrating an example cartridge inserted in an example cradle.

Cartridge 100 provides a dust and moisture resistant seal around disc drive 50, and includes a cartridge housing including top cover 101, bottom portion 102, and connector adapter 105. Top cover 101 is secured to bottom portion 102 via screws 119 (FIG. 1B), whereas connector adapter 105 is simply secured between top cover 101 and bottom portion 102. Cartridge 100 also includes flexible interconnect 400, which electrically couples to disc drive 50 to provide an electrical connection from disc drive 50 to cradle 200 (FIG. 5)

and elastic shock mount 103. As shown in FIG. 1A, external connector 414 is exposed to the external environment outside cartridge 100 to permit an electronic connection to disc drive 50.

Disc drive 50 may comprise, for example, a 2.5-inch form factor disc drive, a 1.8-inch form factor disc drive, a 1.0-inch form factor disc drive or the like. Alternatively, disc drive 50 may be substituted with a solid-state data storage memory, such as a flash memory based storage device or other mass data storage device. Disc drive 50 is at least partially surrounded by elastic shock mount 103, which provides shock absorption and at least partially mechanically decouples disc drive 50 from top cover 101 and bottom portion 102 of cartridge 100.

Elastic shock mount 103 forms void 107, which is sized to receive disc drive 50. In the illustrated example, elastic shock mount 103 is a unitary component and may be molded as a single part from a homogenous elastomer. For example, elastic shock mount 103 may be molded from any suitable elastomer including volcanic and aromatic elastomers. In some examples, elastic shock mount 103 may be molded from Vestenamer.RTM.8012, available from Struktol Corporation of America, Stow, Ohio (Vestenamer.RTM. is a registered trademark of Chem,sche Werke Huels Aktiengesellschaft, Gemany). While elastic shock mount 103 is a unitary component, in alternative examples, an elastic shock mount may be formed from multiple, disjointed components.

In some examples, cartridge 100 may provide electromagnetic interference (EMI) protection for disc drive 50 with an EMI shielding layer surrounding disc drive 50. For example, cartridge 100 may include conductive paint on the inner or outer surface of the cartridge housing. As another example, an EMI shielding bag surrounding disc drive 50 may be included within cartridge 100. In such examples, the EMI shielding bag may either be located within void 107 or encompassing elastic shock mount 103.

Figure 4:
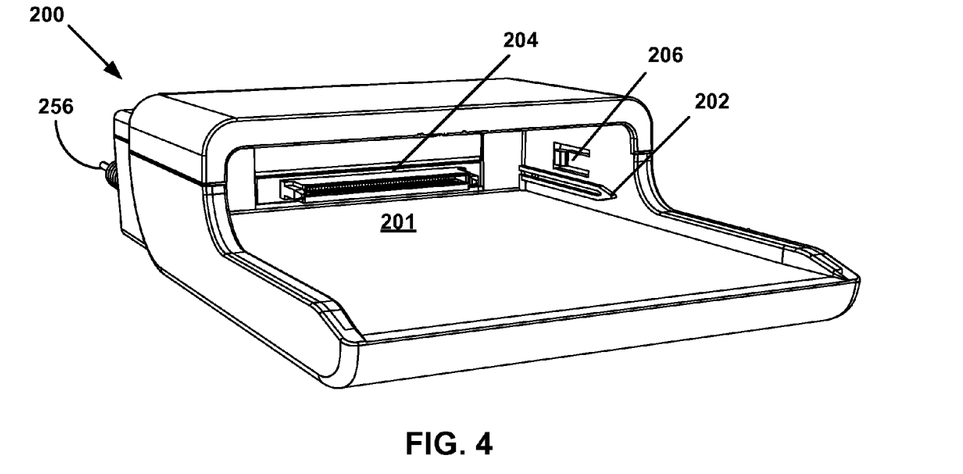
FIG. 4 is a perspective view illustrating an example cradle for a cartridge.

Cartridge 100 includes gripping surface 104 in top cover 101. Gripping surface 104 includes a plurality of indentations to improve a grip of a user on cartridge 100 when inserting or removing cartridge 100 from a cradle, such as cradle 200 (FIG. 4). In other examples, surface 104 may include a rough texture, one or more projections, or more or fewer indentations than illustrated in FIG. 1A. In some examples, cartridge 100 may not include a gripping surface.

As shown in FIG. 1A, cartridge 100 includes a variety of features for mounting cartridge 100 within a cradle, such as cradle 200 (FIG. 4). Cartridge 100 includes a slot 106 on each long side 112, 114 (the slot 106 on side 112 is not shown in FIG. 1A) which aligns with a corresponding projection 202 on cradle 200 (FIG. 4) to assist a user in aligning external connector 414 with a corresponding connector 204 on cradle 200. Slot 106 may be vertically off-center to prevent a user from inserting cartridge 100 in cradle 200 in the wrong orientation, which may damage external connector 414 or connector 204 of cradle 200 or disc drive 50.

Cartridge 100 also includes detent 108, which engages with corresponding tab 206 on cradle 200 to releasably secure cartridge 100 in the cradle 200. Cartridge 100 may include a similar detent 108 on side 112. In other examples, cartridge 100 may include more than two detents. Further, in some examples, tabs 206 may lock cartridge 100 in cradle 200 when cartridge 100 is in use to prevent cartridge 100 from being withdrawn and damaging electrical components in a host device, cradle 200 or disc drive 50.

Cartridge 100 also may include one or more locking indents 110. In the example illustrated in FIGS. 1A-1C, cartridge 100 includes two locking indents located proximate slot 106 on side 114. While not shown in FIG. 1A, cartridge 100 may also include locking indents 110 on side 112. In other examples, locking indents 110 may releasably lock cartridge 100 in engagement with cradle 200 to prevent removal of cartridge 100 from cradle 200 while in use, similar to a locking tab 206.

External connector 414 may be either a male or a female connector, and connector 204 of cradle 204 may be a complimentary female or male connector. In some examples, external connector 414 may comprise connectors as defined by the Information Versatile Disk for Removable usage (iVDR) specification. Each of external connectors 414 and 204 may include a plurality of electrical pins that mate with each other and form an electrical connection between external connector 414 and connector 204. For example, each of external connectors 414 and connector 204 may include 26 electrical pins or other discrete connectors.

As shown in FIG. 1C, protrusions 150 provide gaps 155 between an interior surface of the cartridge housing and an external surface of disc drive 50. As examples, gaps 155 may be at least one millimeter, at least two millimeters, at least three millimeters or even at least five millimeters.

In addition, routing flexible conductors 420 of flexible interconnect 400 as shown in FIG. 1C may effectively increase the buffer space between external electrical connector 404 and internal electrical connector 406. In some examples, cartridge 100 (including an elastic shock mount surrounding the disc drive 50) provides at least three millimeters of travel in any direction between disc drive 50 and an adjacent hard surface, such as top cover 101, bottom portion 102, or external electrical connector 404. In contrast, routing flexible conductors 420 within the volume between external electrical connector 404 and internal electrical connector 406 may effectively decrease the amount of travel between external electrical connector 404 and internal electrical connector 406 by the thickness of the flexible conductors 420. Thus, routing flexible conductors 420 such that they do not extend into the volume between external electrical connector 404 and internal electrical connector 406 increases the travel distance provided between external electrical connector 404 and internal electrical connector 406.

As also shown in FIG. 1C, external electrical connector 404 is offset a distance 461 relative to the internal electrical connector 406 in a direction perpendicular to insertion direction 411 (FIG. 3B) of the internal electrical connector 406. This configuration allows external electrical connector 404 to be adjacent to the bottom surface of the cartridge housing. The bottom surface of the cartridge housing is parallel to insertion direction 415 (FIG. 3B) of external electrical connector 404. In cartridges without shock protection such as that provided by elastic shock mount 103, an external electrical connector is naturally in-line with the internal electrical connector and adjacent to the bottom surface of the cartridge housing. In contrast, in cartridge 100, elastic shock mount 103 separates internal electrical connector 406 from the cartridge housing to provide gap 155. By locating external electrical connector 404 adjacent to the bottom surface of the cartridge housing, external electrical connector 404 is in the same place relative to the bottom surface of the cartridge housing as in cartridges without shock protection. This allows the same cradle to be used to receive cartridges without shock protection as well as to receive cartridge 100.

Figure 2A:
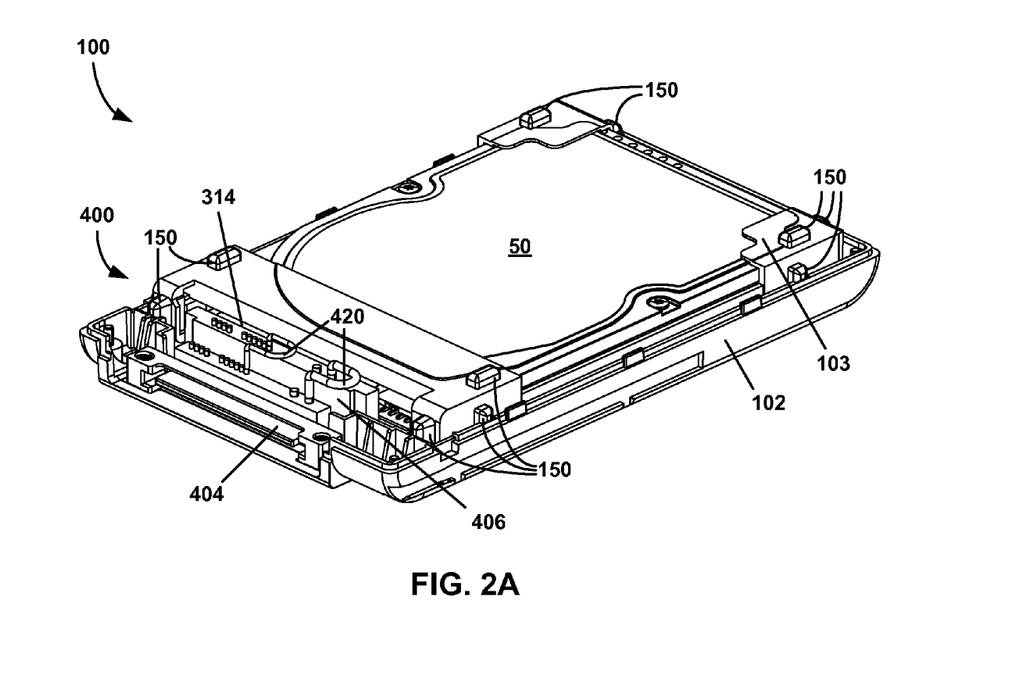
FIGS. 2A-2C illustrate the cartridge of FIGS. 1A-1C with the top cover removed to show an elastic shock mount surrounding the disc drive within the cartridge housing.
Figure 2B:
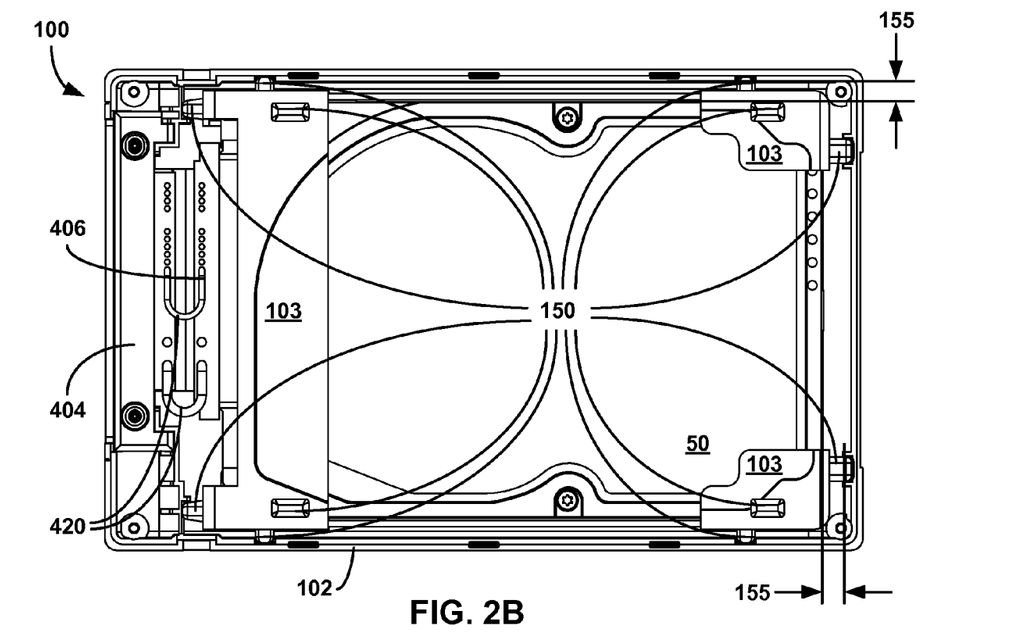
Figure 2C:
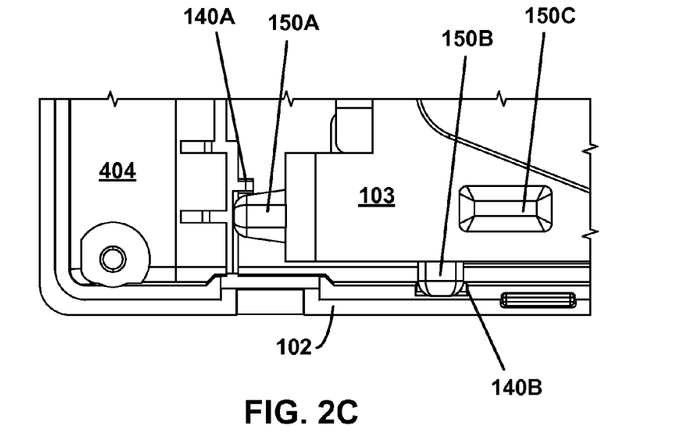

FIGS. 2A-2C illustrate cartridge 100 with top cover 101 removed. Elastic shock mount 103 surrounds disc drive within cartridge 100 to mechanically decouple disc drive 50 from cartridge 100. Elastic shock mount 103 includes protrusions 150 extending between an external surface of disc drive 50 and an interior surface of the cartridge housing. In this manner, disc drive 50 "floats" within cartridge 100. This limits shock forces applied to cartridge 100 from transferring to disc drive 50. Protrusions 150 provide gaps 155 between an interior surface of the cartridge housing and an external surface of disc drive 50. As examples, gaps 155 may be at least one millimeter, at least two millimeters, at least three millimeters or even at least five millimeters.

Further, elastic shock mount protrusions 150 are located adjacent to relatively durable portions of disc drive 50 and non-adjacent to more fragile portions of disc drive 50 such that forces transferred from a shock to the cartridge housing are distributed to the disc drive in a favorable manner. For example, the protrusions may be located adjacent to corners and edges of disc drive 50 and non-adjacent to moving parts of disc drive 50 such as the spindle motor, media discs and actuator assembly. More specifically, protrusions 150 may each be positioned to intersect a plane coplanar to wall of the disc drive housing of disc drive 50. In this manner, shock forces transferred from cartridge 100 to disc drive 50 via protrusions 150 will act upon the substantially stiff portions of the disc drive housing and not deflect the relatively fragile walls of the disc drive housing.

At the top and bottom, disc drive 50 is supported by four of protrusions 150. Comparatively, disc drive 50 is supported by only two protrusions 150 from the sides and ends. For this reason, protrusions 150 on the sides and ends of disc drive 50 may be stiffer than the protrusions on the top and bottom of disc drive 50 such that the net stiffness provided by protrusions 150 is about the same in each direction.

The top cover 101 and the bottom portion 102 of cartridge 100 include slots to hold protrusions 150 as well as elastic shock mount 103 in place. Because disc drive 50 is secured within elastic shock mount 103, disc drive 50 is also held in place via elastic shock mount 103. A detail view of protrusions 150A and 150B as well as slots 140A and 140B is shown in FIG. 2C. Protrusions 150A and 150B mate with slots 140A and 140B respectively.

Figure 3A:
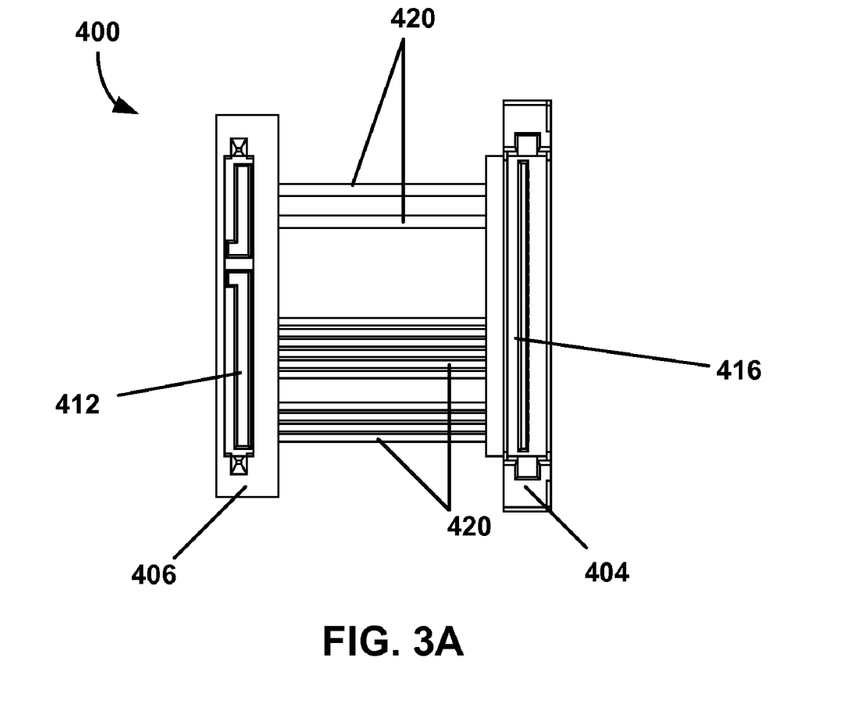
FIGS. 3A-3B illustrate an example flexible interconnect.
Figure 3B:
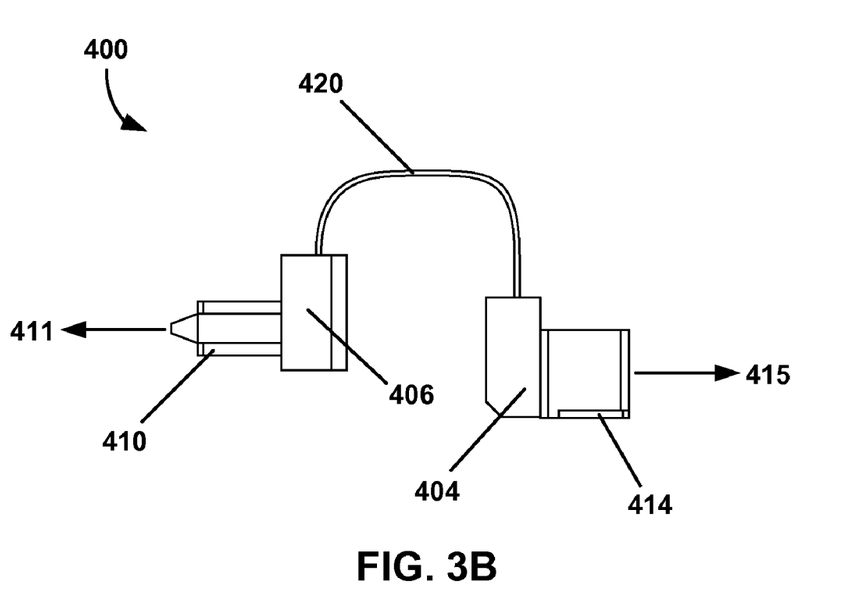

FIGS. 3A-3B illustrate an example flexible interconnect 400. Flexible interconnect 400 includes external electrical connector 404 and internal electrical connector 406 coupled by flexible conductors 420. External electrical connector 404 couples to a host device, such as, for example, cradle 200. Internal electrical connector 406 couples to data port 53 of disc drive 50. In the illustrated example, external electrical connector 404 comprises a iVDR connector and internal electrical connector 406 comprises a SATA connector. In other examples, external electrical connector 404 or internal electrical connector 406 may comprise other connectors, such as, for example, an parallel advanced technology attachment (PATA) connector, a universal serial bus (USB) connector, an IEEE 1394 connector, or the like.

As best seen in FIG. 3B, in some examples, the flexible conductors 420 may be coupled to external electrical connector 404 and internal electrical connector 406 in a substantially perpendicular orientation. That is, flexible conductors 420 may exit external electrical connector 404 approximately perpendicular to insertion direction 415 of plug portion 414 of external electrical connector 404. Plug portion 414 is the portion of external electrical connector 404 which comprises the electrical pins 416 which engage with electrical connections in the host device and establish electrical communication between the host device, such as cradle 200, and the cartridge. Similarly, flexible conductors 420 may exit internal electrical connector 406 approximately perpendicular to insertion direction 411 of plug portion 410 of internal electrical connector 406. Again, plug portion 410 of internal electrical connector 406 is the portion which comprises the electrical pins 412 which engage with electrical connections of a data port of the disc drive (e.g., data port 53 of disc drive 50, see FIG. 1B). The perpendicular orientation of the flexible conductors 420 relative to external electrical connector 404 and internal electrical connector 406 allows flexible conductors 420 to be routed within a cartridge such that no portion of flexible conductors 420 lies in a volume defined by the space between the external electrical connector 404 and the internal electrical connector 406.

Flexible conductors 420 assist elastic shock mount 103 in mechanically decoupling disc drive 50 from top cover 101 and bottom portion 102 of cartridge 100. For example, external electrical connector 404 may be rigidly attached to bottom portion 102 and/or top cover 101 of cartridge 100. If internal electrical connector 406 were rigidly connected to external electrical connector 404, this would mechanically couple disc drive 50 to cartridge 100, and would transmit at least some mechanical forces experienced by cartridge 100 to disc drive 50, risking damage of disc drive 50 and possible corruption or loss of data stored by disc drive 50. However, flexible conductors 420 reduce or substantially eliminates the mechanical coupling between disc drive 50 and cartridge 100, which, along with elastic shock mount 103, protects disc drive 50 from mechanical forces, which in turn protects data stored by disc drive 50.

Flexible conductors 420 may comprise, for example, a ribbon wire, a plurality of individual or twisted pair wires, a flexible circuit, or the like. In examples in which flexible conductors 420 comprises a ribbon connector or a flexible circuit, flexible conductors 420 may comprise a plurality of longitudinal slits extending for at least a portion of flexible conductors 420 in a longitudinal direction between external electrical connector 404 to internal electrical connector 406. The longitudinal slits may improve flexibility of the flexible conductors 420 in a lateral direction.

Flexible conductors 420 include a set of conductors which each connect a respective one of electrical pins 412 to a respective one of electrical pins 416. The set of conductors may be individually encapsulated in electrical insulation, or may be encapsulated in common insulation, such as a ribbon wire. Alternatively, flexible conductors 420 may be printed as a flexible circuit.

The conductors of flexible conductors 420 may be divided into one or more groups, each of which conducts specific electrical signals. For example, when external electrical connector 404 comprises an iVDR connector and internal electrical connector 406 comprises a SATA connector, external electrical connector 404 may comprise electrical pins 416 numbered 1-7 and 12-26. Pins 1-7 may be used for communication port A of the disc drive (e.g., disc drive 50) according to the SATA specification, pins 15-20 are used for power and ground, pins 21-25 are used for identification, and pin 26 is reserved for testing. Internal electrical connector 406 may comprise, for example, 22 pins, and pins 1-7 may be used for communication port A, pins 8-16 for power and ground, and pins 17-22 for identification.

Constructing flexible interconnect 400 to include flexible conductors 420 that exit external electrical connector 404 and internal electrical connector 406 substantially perpendicular to plugs 414 and 410 (referred to as a "flexible service loop"), respectively may provide advantages. As a result of the mechanical coupling between external electrical connector 404 and the housing of cartridge 100, if external electrical connector 404 and internal electrical connector 406 are too rigidly mechanically coupled, a mechanical force applied to cartridge 100 will be transferred to disc drive 50, which may cause a read/wire head of disc drive 50 to crash and damage a magnetic disc in disc drive 50, potentially rendering at least some of the data stored by the magnetic disc corrupt or unreadable. If the mechanical force is sufficient, disc drive 50 may be damaged to an extent such that the entire disc drive 50 is non-functional.

However, by mechanically decoupling external electrical connector 404 and internal electrical connector 406 via the flexible service loop, the transfer of force between the two connectors 404 and 406 is limited, thus providing further mechanical protection for disc drive 50.

Figure 6A:
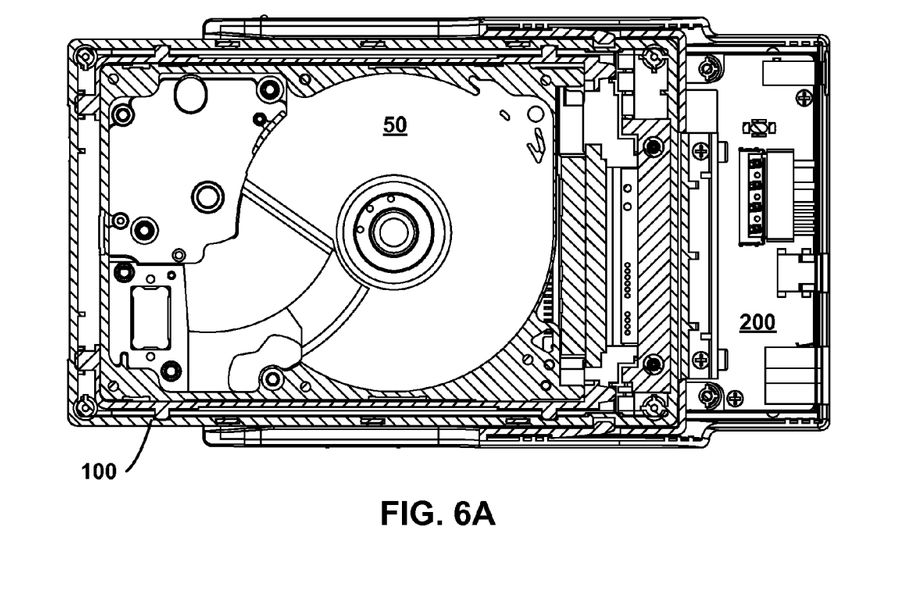
FIGS. 6A-6B are cut-away views of the cradle and cartridge of FIG. 5 showing the cartridge secured within the cradle by a flexible detent.
Figure 6B:
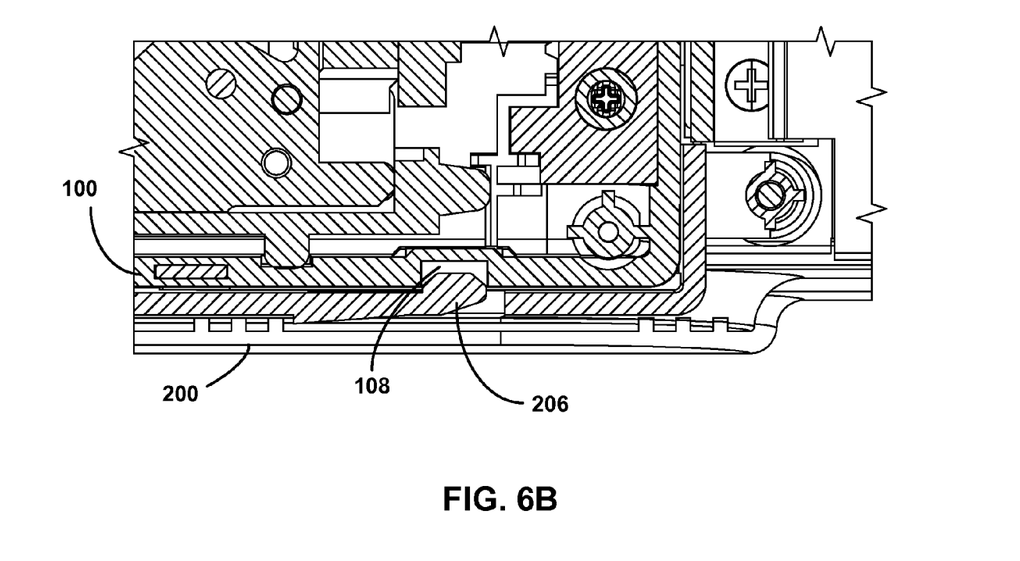

As previously mentioned, FIG. 4 illustrates cradle 200. In addition, FIG. 5 illustrates cartridge 100 inserted into cradle 200, and FIGS. 6A-6B are cut-away views of cartridge 100 inserted into cradle 200.

Cradle 200 forms bay 201, which is sized to receive cartridge 100. Cradle 200 provides connector 204, which mates with external connector 414 to electrically connect disc drive 50 within cartridge 100 to cradle 200 via flexible interconnect 400. Cradle 200 also includes connector 256 to connect cradle 200 to a host device and/or a power supply (not shown). In addition, cradle 200 includes features for securing cartridge 100 within bay 201.

As an example, cradle 200 includes projections 202, which engage slots 106 of cartridge 100 to align cartridge 100 within cradle 200. As another example, cradle 200 includes tabs 206, which engage detents 108 of cartridge 100 to releasably secure cartridge 100 in cradle 200. Tabs 206 may lock cartridge 100 in cradle 200 when cartridge 100 is in use to prevent cartridge 100 from being withdrawn and damaging electrical components in a host device, cradle 200 or disc drive 50. Tabs 206 may simply be a protrusion, or may also include a slit in the wall of cradle 200 to increase the flexibility of tabs 206. Other techniques for positively securing cartridge 100 in cradle 200 are also possible.

Shock Testing

Cartridge 100 provides a protective enclosure for disc drive 50. An example built according to the above description has passed a shock test including dropping a cartridge and disc drive assembly from a height of 1.5-2.0 meters on to a 50-millimeter thick lauan plywood on concrete (equivalent to MIL-STD-810C). The cartridge and disc drive assembly was dropped in a variety of orientations including: bottom, top, right side, left side, rear (upper connector), front (lower connector), rear right edge, rear left edge, front left edge, front right edge, for a total of drops per tested assembly.

The testing techniques apply more than 900 G ($8,820 m/s^2$) to the case of a cartridge. The shock measured when cartridge and disc drive assembly was dropped on the lauan plywood from 20 centimeters (cm) high is equivalent to the shock caused when the cartridge and disc drive assembly is dropped on a carpeted floor from 70 cm high.

Following the testing, the cartridge showed no visible or structural damage, but may have required reassembly following the testing and/or between drops. In addition, the disc drive experienced no errors from the shocks as confirmed by a surface scan of the media surface.

The implementations described above and other implementations are within the scope of the following claims.

The invention claimed is:

1. An apparatus comprising:
   a cartridge housing sized to enclose a data storage device; and
   an interconnect configured to dampen vibrations propagating from the cartridge to the data storage device, the interconnect including:
   an external electrical connector mechanically coupled to the cartridge and defining an insertion direction;
   an internal electrical connector mechanically coupled to the data storage device and defining an insertion direction that is substantially parallel to the external electrical connector insertion direction; and
   an electrical conductor having a first portion extending from the external electrical connector orthogonal to the external electrical connector insertion direction, a second portion extending from the internal electrical connector orthogonal to the internal electrical connector insertion direction, and a flexible portion connected to distal ends of the first and second portions and routed entirely outside a buffer space between opposing faces of the electrical connectors from a first straight boundary between top edges of the opposing faces to a second straight boundary between bottom edges of the opposing faces.

2. The apparatus of claim 1, wherein the external electrical connector is positioned in relation to a reference surface of the cartridge housing that is parallel to the insertion direction of the external electrical connector.

3. The apparatus of claim 1 characterized by no portion of the electrical conductor being disposed in the buffer space defined between the external electrical connector and the internal electrical connector.

4. The apparatus of claim 3, wherein the buffer space defines a spatial separation between the external electrical connector and the internal electrical connector that is less than three millimeters.

5. The apparatus of claim 1, wherein the buffer space defines a spatial separation between the external electrical connector and the internal electrical connector that is less than one millimeter.

6. The apparatus of claim 1, further comprising an elastic shock mount between the data storage device and an internal surface of the cartridge housing.

7. The apparatus of claim 6, wherein the elastic shock mount is configured to allow the data storage device to travel less than one millimeter in any direction within the cartridge without contacting the cartridge housing.

8. The apparatus of claim 6, wherein the elastic shock mount is configured to allow the data storage device to travel less than three millimeters in any direction within the cartridge without contacting the cartridge housing.

9. The apparatus of claim 1, wherein the data storage device is a disc drive.

10. A method comprising:
    enclosing a data storage device in a cartridge housing; and
    mechanically coupling the data storage device to an internal electrical connector, defining an internal electrical connector insertion direction, of an interconnect that dampens vibrations from the cartridge housing to the data storage device, the interconnect including an external electrical connector, defining an external electrical connector insertion direction that is substantially parallel to the internal electrical connector insertion direction, and the interconnect further including an electrical conductor having a first portion extending from the external electrical connector orthogonal to the external electrical connector insertion direction, a second portion extending from the internal electrical connector orthogonal to the internal electrical connector insertion direction, and a flexible portion connected to distal ends of the first and second portions and routed entirely outside a buffer space between opposing faces of the electrical connectors from a first straight boundary between top edges of the opposing faces to a second straight boundary between bottom edges of the opposing faces.

* * * * *